(12) United States Patent
Metzemacher et al.

(10) Patent No.: US 7,528,191 B2
(45) Date of Patent: May 5, 2009

(54) COMPOSITION BASED ON PRE-EXFOLIATED NANOCLAY AND USE THEREOF

(75) Inventors: Heinz-Dieter Metzemacher, Cologne (DE); Rainer Seeling, Munich (DE)

(73) Assignee: Rockwood Clay Additives, GmbH, Moosburg (DE)

( * ) Notice: Subject to any disclaimer, the term of this patent is extended or adjusted under 35 U.S.C. 154(b) by 152 days.

(21) Appl. No.: 10/541,496

(22) PCT Filed: Jan. 8, 2004

(86) PCT No.: PCT/EP2004/000072

§ 371 (c)(1),
(2), (4) Date: Jan. 12, 2006

(87) PCT Pub. No.: WO2004/063260

PCT Pub. Date: Jul. 29, 2004

(65) Prior Publication Data

US 2006/0155035 A1    Jul. 13, 2006

(30) Foreign Application Priority Data

Jan. 8, 2003   (GB) ................. 0300374.6
Jun. 12, 2003  (DE) ................. 103 26 977

(51) Int. Cl.
*A61Q 19/00* (2006.01)
*D06M 15/643* (2006.01)
*H05B 6/14* (2006.01)

(52) U.S. Cl. ............... 524/860; 524/731; 219/619

(58) Field of Classification Search ............... 219/619, 219/618, 600; 523/443, 445, 440; 977/773, 977/778, 700, 832; 524/731, 860
See application file for complete search history.

(56) References Cited

U.S. PATENT DOCUMENTS

| | | |
|---|---|---|
| 1,756,236 A | 4/1930 | Beers |
| 3,516,959 A | 6/1970 | Jonas |
| 3,576,388 A | 4/1971 | Burns |
| 4,069,288 A | 1/1978 | Barkhuff, Jr. et al. |
| 4,070,315 A | 1/1978 | Mehta et al. |
| 4,173,561 A | 11/1979 | Tabana et al. |
| 4,255,318 A | 3/1981 | Kaide et al. |
| 4,391,637 A | 7/1983 | Mardis et al. |
| 4,402,881 A | 9/1983 | Alther |
| 4,410,364 A | 10/1983 | Finlayson |
| 4,412,018 A | 10/1983 | Finlayson |
| 4,434,075 A | 2/1984 | Mardis |
| 4,434,076 A | 2/1984 | Mardis |
| 4,472,538 A | 9/1984 | Kamigaito et al. |
| 4,474,706 A | 10/1984 | Clay et al. |
| 4,517,112 A | 5/1985 | Mardis et al. |
| 4,546,126 A | 10/1985 | Breitenfellner et al. |
| 4,558,075 A | 12/1985 | Suss et al. |
| 4,582,866 A | 4/1986 | Shain |
| 4,664,820 A | 5/1987 | Magauran et al. |
| 4,695,402 A | 9/1987 | Finlayson et al. |
| 4,708,975 A | 11/1987 | Shain |
| 4,739,007 A | 4/1988 | Okada et al. |
| 4,777,206 A * | 10/1988 | Rittler ................. 524/445 |
| 4,826,899 A | 5/1989 | Rees |
| 4,866,018 A | 9/1989 | Elliot |
| 4,874,728 A | 10/1989 | Elliot et al. |
| 4,891,392 A | 1/1990 | Abe et al. |
| 5,017,637 A | 5/1991 | Smith et al. |
| 5,091,462 A | 2/1992 | Fukui et al. |
| 5,132,350 A | 7/1992 | Keogh |
| 5,164,460 A | 11/1992 | Yano et al. |
| 5,236,985 A | 8/1993 | Hayami |
| 5,429,999 A | 7/1995 | Nae et al. |
| 5,554,670 A | 9/1996 | Giannelis et al. |
| 5,747,560 A | 5/1998 | Christiani |
| 5,773,502 A | 6/1998 | Takekoshi et al. |
| 5,780,376 A | 7/1998 | Gonzales et al. |
| 5,827,906 A | 10/1998 | Metzemacher et al. |
| 5,936,023 A | 8/1999 | Kato et al. |
| 6,034,163 A | 3/2000 | Barbee et al. |
| 6,084,008 A | 7/2000 | Liu |
| 6,130,256 A | 10/2000 | Nao |
| 6,139,962 A | 10/2000 | Herget et al. |
| 6,380,295 B1 * | 4/2002 | Ross et al. ................. 524/443 |
| 6,414,070 B1 | 7/2002 | Kausch et al. |

(Continued)

FOREIGN PATENT DOCUMENTS

DE         19921472         11/2000

(Continued)

OTHER PUBLICATIONS

Giannelis "Flame Retardant Nanocomposite Materials", Annual Conference on Fire Research NISTIR 6242, Nov. 2-5, 1998, pp. 39-40.

(Continued)

*Primary Examiner*—Daniel L Robinson
(74) *Attorney, Agent, or Firm*—Meyertons, Hood, Kivlin, Kowert & Goetzel, P.C.; Eric B. Meyertons

(57) ABSTRACT

The invention relates to a composition, in particular a pulverulent master batch, comprising at least one nanoclay composed of a swellable inorganic layered material which has been modified by at least one siloxane component and by at least one non-anionic organic compound which has at least one aliphatic or cyclic radical having from 6 to 32 carbon atoms.

The pulverulent master batch can result in a homogeneous mixture with a polymer powder and can be used as such. Also, a polymer master batch can be produced by compounding of the pulverulent master batch with a carrier polymer. The pulverulent master batch or the polymer master batch can be used as filler or in filler systems in various polymer compositions.

26 Claims, No Drawings

U.S. PATENT DOCUMENTS

| | | | |
|---|---|---|---|
| 6,451,895 | B1 | 9/2002 | Topolkaraev et al. |
| 6,492,453 | B1 | 12/2002 | Ebrahimian et al. |
| 6,583,209 | B2 | 6/2003 | Mehta et al. |
| 6,605,655 | B1 | 8/2003 | Kato et al. |
| 6,610,770 | B1 | 8/2003 | Ross et al. |
| 6,632,868 | B2 * | 10/2003 | Qian et al. .................. 524/445 |
| 6,649,713 | B2 | 11/2003 | Tang et al. |
| 6,683,122 | B1 | 1/2004 | Zilg et al. |
| 6,750,282 | B1 | 6/2004 | Schall |
| 6,759,464 | B2 | 7/2004 | Ajbani et al. |
| 6,794,437 | B2 | 9/2004 | Ross et al. |
| 6,822,035 | B2 | 11/2004 | Chaiko |
| 6,849,680 | B2 * | 2/2005 | Knudson et al. ............. 524/445 |
| 6,911,488 | B2 * | 6/2005 | Cody et al. .................. 523/210 |
| 7,087,529 | B2 * | 8/2006 | Fang et al. .................. 438/692 |
| 7,135,508 | B2 * | 11/2006 | Chaiko et al. ............... 523/216 |
| 7,157,516 | B2 * | 1/2007 | Chaiko ....................... 524/445 |
| 7,312,258 | B2 | 12/2007 | Hoppler et al. |
| 2006/0155018 | A1 | 7/2006 | Metzemacher et al. |
| 2007/0072980 | A1 * | 3/2007 | Rainer et al. ................ 524/445 |
| 2008/0004381 | A1 | 1/2008 | Putsch |

FOREIGN PATENT DOCUMENTS

| | | |
|---|---|---|
| GB | 1118723 | 7/1968 |
| JP | 55112248 | 8/1980 |
| JP | 62101644 | 5/1987 |
| JP | 62181144 | 8/1987 |
| JP | 63030588 | 2/1988 |
| JP | 63260957 | 10/1988 |
| JP | 63273693 | 11/1988 |
| JP | 995630 | 4/1997 |
| JP | 10139998 | 5/1998 |
| JP | 10204298 | 8/1998 |
| JP | 11228748 | 8/1999 |
| WO | 9730950 | 8/1997 |
| WO | 97/31873 | 9/1997 |
| WO | 0066657 | 11/2000 |
| WO | 0078540 | 12/2000 |
| WO | 0140369 | 6/2001 |
| WO | 02100936 | 12/2002 |

OTHER PUBLICATIONS

Miller, ed. "Tiny Clay Particles pack potent properties punch" Plastics World, Oct. 1997, pp. 36-38.

Liu, Y. et al., "Preparation of polypropylene/polystyrene/montmorillonite nano-composites", China Plastics, vol. 16, No. 2, Feb. 2002.

Kyaowa Chemical Industry Co., Ltd. Product "Additives for Resins", 1997, 2 pages.

Gilman et al. "Nanocomposites: A Revolutionary New Flame Retardant Approach," Sample Journal, vol. 33 No. 4, 1997, pp. 40-46.

Gilman et al. "Flammability and Thermal Stability Studies of Polymer Layered -Silicate (Clay) Nanocomposites-II" Flame Retardancy, 10th Annual BCC Conference, May 24-26, 1999, pp. 1-11.

Notice of Opposition to EP Patent No. 1560879 filed Mar. 7, 2007 17 pages.

Notice to of Opposition to EP Patent No. 1177252, filed Mar. 15, 2006, 11 pages.

Notice to of Opposition to EP Patent No. 1177252, filed Feb. 24, 2006, 6 pages.

Observations by Third Party to EP Patent Application No. 00910805 filed Sep. 9, 2004, 8 pages.

U.S. Appl. No. 10/541,625.

Ishida, et al., "General Approach to Nanocomposite Preparation", Chem. Mater. 2000, 12, pp. 1260-1267.

Süd-Chemie AG, "Nanofil® 5" Datasheet.

Süd-Chemie AG, "Nanofil® 15" Datasheet.

Laus, et al., "New hybrid nanocomposites based on an organophilic clay and poly(styrene-b-butadiene) copolymers", J. Mater. Res., vol. 12, No. 11, Nov. 1997, pp. 3134-3139.

U.S. Patent and Trademark Office "Communication" for U.S. Appl. No. 10/557,724 mailed Oct. 1, 2008; available in PAIR.

* cited by examiner

COMPOSITION BASED ON PRE-EXFOLIATED NANOCLAY AND USE THEREOF

BACKGROUND

This application is a national phase application based on PCT/EP2004/000072 for filing with the United States Patent and Trademark Office. This application claims priority from the PCT application listed above as well as GB 0300374.6 filed on Jan. 8, 2003 and DE 103 26 977.0 filed on Jun. 12, 2003.

The invention relates to compositions, in particular masterbatches based on organically intercalated nanoclay, to inventive uses of these masterbatches, and to a process for their preparation.

It has been known for a relatively long time that the properties of plastics or of polymeric materials in general can be improved by means of nanoclays as fillers. A significant source of these nanoclays here is water-swellable naturally occurring or synthetic phyllosilicates. Swelling in water releases nanolamellae, thus producing genuine networks. Polymers or long-chain ions in general, or other charged particles, can penetrate into the intermediate layers, this process being termed intercalation.

To permit the resultant intercalated nanoclays to be used industrially, they have to be exfoliated with use of further swelling agents. The initial close-range order within the phyllosilicates is lost in this exfoliation process. Completely exfoliated smectites, e.g. montmorillonite as an example of this type of phyllosilicate, can form particle sizes with a very high aspect ratio of up to 1000, obtained via layers with diameter of about 1 nm, width of about 100 nm, and length of from 500 to 1000 nm.

For the purposes of this application, the term nanoclay is always understood to mean organically intercalated phyllosilicates (layered silicates). This corresponds to the interpretation generally used in this sector. These nanoclays are commercially available. The name "Nanofil" is used by Südchemie AG to market a montmorillonite-based nanoclay. Examples are "Nanofil 15" and "Nanofil 5", these having been organically intercalated with distearoyldimethylammonium chloride. A product from the US company Elementis Corp. with the name "EA 108" is based on hectorite.

A chemical problem in the use of these nanoclays in the plastics-processing industry is that the naturally occurring or synthetic phyllosilicates first have to be rendered organophilic so that they can be processed with the hydrophobic plastics. Cation exchange has achieved importance as a significant process for this organophilic modification of the phyllosilicates. Cation exchange is carried out in the aqueous phase with cationic surfactants based on ammonium surfactants, or on phosphonium surfactants, or on sulfonium surfactants.

Another known process is acid activation. This uses hydrochloric acid, for example.

Nanoclays have achieved importance as additives in halogen-free flame retardants. For example, DE-A-199 21 472 discloses a flame-retardant polymer composition which comprises a thermoplastic or crosslinkable polymer, magnesium hydroxide, calcium hydroxide, zinc hydroxide, and/or aluminum hydroxide and/or double hydroxides of these as halogen-free filler, and also an organically intercalated phyllosilicate based on swellable smectites.

U.S. Pat. No. 6,380,295 B1 describes and claims an ion-exchanged reaction product which is prepared via intercalation and reaction of a smectitic clay, a quaternary ammonium compound, and one or more non-anionic polymers, selected from the group of the polyurethanes, polyamides, polyesters, polycarbonates, polyepoxides, and polyolefins.

Nanoclays are preferred for use as additives in halogen-free flame retardants because they promote formation of a stable crust layer during combustion of the polymer. Formation of this crust layer inhibits further ignition of the polymer, or collapse of, or fall of material from, the burning polymer, these being processes which could promote fire spread.

The nanoclay fillers have to be exfoliated within the polymer into which they are to be introduced if they are to develop their activity. However, process technology problems have been found in the prior art during the compounding process when the swelling agents needed for this purpose are present, especially when organic solvents are used. It has hitherto also been impossible to use conventional coupling agents, such as functionalized silanes.

In the finished polymer, an unfavorable factor observed hitherto is that the use of nanoclay fillers considerably impairs mechanical properties and extrudability of polymer compositions. Nanoclay fillers pose problems during incorporation into the respective polymer composition. Because their exfoliation is difficult, it has also been difficult hitherto to disperse them uniformly through the entire polymer composition. This and their high cost to date have limited their field of application. Additional problems arise in the electrical sector. In particular in brine, immersion tests using 300 V over two or more days led to failure of the polymer via arcing.

Against this background, an object underlying the present invention was to provide nanoclay fillers which can be uniformly dispersed in various polymeric materials, to improve their properties, particularly with respect to pre-exfoliation and, respectively, exfoliation after incorporation into the desired polymer, and to introduce the use of nanoclay fillers into new application sectors, while reducing the costs which have to be incurred for their use, and with this increasing their cost-effectiveness.

The invention therefore provides a composition, in particular a pulverulent (powder) masterbatch, comprising at least one nanoclay based on a swellable inorganic layered material, where the nanoclay has been modified with at least one siloxane component (A) and with at least one non-anionic organic component (B) which has at least on aliphatic or cyclic radical having from 6 to 32 carbon atoms.

The term masterbatch is known per se in chemistry and is the name for a premix which is first prepared and then used in a production process or process sequence. For the purposes of the present invention, it has been found that disadvantages known from the prior art can be eliminated if the pulverulent masterbatch is first prepared and is used in the form of a previously prepared unit in a polymer or in a polymer composition, where this can also be a plastic, as a filler for modification of properties.

The average particle size of the nanoclay present in the masterbatch is from 0.1 to 1000 μm, preferably from 0.1 to 100 μm, particularly preferably from 1 to 15 μm, and very particularly preferably from 2 to 10 μm.

The nanoclay may comprise ground nanoclay or may have been completely ground. Grinding per se is a known process which permits high throughput and therefore provides high yields of ground nanoclay. No particular requirements have to be placed upon the grinding process itself. It can take place by means of a jet mill or ball mill, but in particular via a vibratory mill, roll mill, impact mill, attrition mill, or pinned disk mill.

Ground nanoclay in which the average particle size has been lowered below the particle size of the nanoclays available commercially is highly advantageous particularly when the result is preparation of a masterbatch which serves together with halogen-free fillers for use as a flame retardant in polymer compositions. Very surprisingly, although the nanoclays have then been reduced to an average particle size at which it would per se have to be assumed that they have become incapable of achieving any desired action, it is nevertheless found that use of this type of masterbatch markedly improves not only the mechanical properties of the polymer composition but also its processing properties.

This improvement of mechanical and of processing properties permits higher loading of the polymer composition with flame-retardant, preferably halogen-free filler, for the same mechanical properties and the same processing quality.

On the other hand, however, lower loading with the flame-retardant filler may be preferred in order thus to improve mechanical properties and processing quality further without bringing about any simultaneous impairment of the flame-retardant properties of the polymer compositions. Further details will be given at a later stage below of the inventive use of the pulverulent masterbatch for providing flame retardancy to polymers or to polymer compositions.

The inorganic layered material has preferably been selected from naturally occurring or synthetic phyllosilicates. Phyllosilicates of this type which may particularly be mentioned are the smectites, among which are montmorillonite, hectorite, saponite, and beidellite. Bentonite can also be used.

Compounds suitable for the organic intercalation process are familiar to the person skilled in the art. In particular, quaternary onium compounds may be used, preferably quaternary ammonium compounds. Suitable compounds also encompass protonated amines, organic phosphonium ions, and/or aminocarboxylic acids.

Any oligomeric (in accordance with IUPAC guidelines) or polymeric siloxane or siloxane derivative can be used as siloxane component. Siloxane derivatives here are preferably those in which at least one of the $CH_3$ side groups on the Si atom is replaced by another functional group. Examples of individual compounds from siloxane derivative groups which are generally suitable are stated in the examples. Without restriction, particular preference is given to oligoalkylsiloxanes, polydialkylsiloxanes, polyalkylarylsiloxanes, polydiarylsiloxanes, or any desired mixtures of these, where the siloxane derivatives mentioned have particularly preferably been functionalized by at least one reactive group, with the exception of hydrolyzable silanes.

The at least one non-anionic organic component which has at least one aliphatic or cyclic radical having from 6 to 32 carbon atoms, preferably from 8 to 22 carbon atoms, in particular from 10 to 18 carbon atoms, is preferably a fatty acid derivative from one of the substance classes below:

1. Fatty alcohols, saturated or unsaturated, including both primary and secondary alcohols, in particular having $C_6$-$C_{22}$ radicals;
2. Fatty aldehydes, fatty ketones

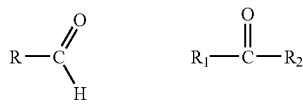

where R and, respectively, $R_1$ and/or $R_2$ are a radical having from 6 to 32 carbon atoms;
3. Fatty alcohol polyglycol ethers
   R—(O—$CH_2$—$CH_2$)—OH
   where R is a radical having from 6 to 32 carbon atoms;

4. Fatty amines
   R—$NH_2$, $R_1$—NH—$R_2$, R—$N(CH_3)_2$
   where R and, respectively, $R_1$ and/or $R_2$ are a radical having from 6 to 32 carbon atoms;
5. Mono-, di-, and triglyceride esters

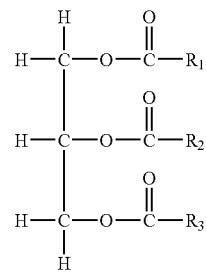

where it is preferable that one radical from $R_1$, $R_2$, and $R_3$ may also have fewer than 6 carbon atoms.
6. Fatty acid alkanolamides

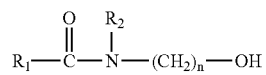

where it is preferable that $R_1$ and $R_2$ are radicals having from 6 to 32 carbon atoms, n being from 1 to 6;
7. Fatty acid amides

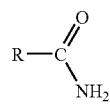

where R is a radical having from 6 to 32 carbon atoms;
8. Alkyl esters of fatty acids

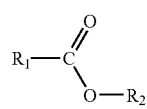

where $R_1$ is a radical having from 6 to 32 carbon atoms and $R_2$ may also have fewer than 6 carbon atoms
9. Fatty acid glucamides

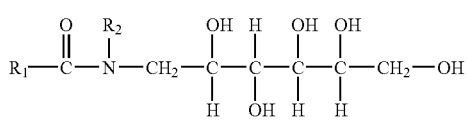

where it is preferable that $R_1$ and $R_2$ are radicals having from 6 to 32 carbon atoms;

10. Waxes
11. Dicarboxylic esters

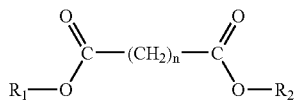

where it is preferable that $R_1$ and $R_2$ are aliphatic radicals having from 6 to 32 carbon atoms, n being from 1 to 6;

12. Fatty acid soaps insoluble in water (these being the salts of long-chain carboxylic acids with divalent metals)

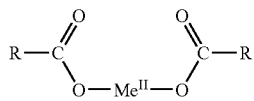

where at least one R has from 6 to 32 carbon atoms and $Me^{II}$ is a divalent metal;

13. Montan waxes (these being waxes whose chain length is from $C_{26}$ to $C_{32}$);
14. Paraffins and PE waxes.

Particular preference is given to fatty alcohols, fatty amines, triglyceride esters, alkyl esters of fatty acids, and waxes. Examples of individual compounds from substance groups which are generally suitable are stated in the examples.

The inventive masterbatch or the inventive composition may also comprise other components as long as this is not detrimental to the action of the inventive additive mixture, examples being stabilizers, flow aids, anti-caking agents, such as silica, e.g. Sipernat 22 S or Aerosil R 972 (Degussa, Germany) or the like.

Surprisingly, it has been found for the purposes of the invention that the combination composed of at least one oligomeric or polymeric siloxane component as described herein and of at least one non-anionic organic component which has at least one aliphatic or cyclic radical having from 6 to 32 carbon atoms, in particular of a non-anionic fatty acid derivative as described herein, can have a concerted action which is synergistic and particularly advantageous during the pre-exfoliation of a nanoclay. For example, modification of a nanoclay via the siloxane component (A) alone does not bring about any significant layer-separation increase and pre-exfoliation. No exfoliation takes place during subsequent incorporation into the desired plastics matrix, e.g. polypropylene; in X-ray diffractometry, the 001 peak of the organophilicized nanoclay remains clearly visible and a layer separation is determinable. The same result is also found during modification of the nanoclay via the non-anionic component (B) alone. Although a certain layer-separation increase can be discerned in X-ray diffractometry, the 001 peak of the organophilicized nanoclay remains clearly visible in X-ray diffractometry after subsequent incorporation into the plastics matrix, and a layer separation can be determined. No exfoliation of the individual layers has therefore taken place within the plastic. In contrast to this, when the nanoclay is modified with the inventive combination composed of at least one siloxane component (A) as defined above and with the at least one non-anionic organic component (B) as described here, particularly advantageous pre-exfoliation is achieved and practically complete delamination or exfoliation is achieved after subsequent incorporation into the plastics matrix; the 001 peak of the organophilicized nanoclay has become practically invisible.

The invention can also use anionic organic components which have at least one aliphatic or cyclic radical having from 6 to 32 carbon atoms, but use of non-anionic components is particularly preferred because the inventive compositions have particularly advantageous product properties.

All of the components (A) and (B) mentioned here serve for surprisingly good improvement of exfoliation of the nanoclay, and the components mentioned here also have the particular advantage of having the best chemical compatibility with the intercalating agents usually used, while nevertheless being inexpensive.

One particular advantage of these components (A) and (B) is obtained in combination with ground nanoclay, because this is a fine-particle powder and therefore can form a fine dust and thus represents a potential source of explosion risk. When one of the additives specified is used, or any desired mixture of the additives specified, this problem can be significantly mitigated or eliminated.

Preference is given to fatty acid derivatives derived from fatty acids having from 10 to 13 carbon atoms. Mention should be made here particularly of lauric acid, palmitic acid, stearic acid, oleic acid, linoleic acid, caproic acid, and castor oil. The fatty acid derivatives, in particular the specified representatives of this group, have the advantage of being readily obtainable in large quantities and at the same time being inexpensive, and secondly of permitting safe handling on a large industrial scale. The fatty acid derivatives encompass hydrogenated derivatives, alcohol derivatives, amine derivatives, and mixtures of these. They may also be derived from the group of the polymeric fatty acids, of the keto fatty acids, of the fatty acid alkyloxazolines and fatty acid alkylbisoxazolines, or mixtures of these. Among the unsaturated fatty acids, particular mention may be made of the mono- or polyunsaturated hydroxy fatty acids.

The inventive composition may also comprise a component selected from the group of the ethylene-propylene copolymers (EPM), the ethylene-propylene terpolymers (EPDM), the thermoplastic elastomers, the coupling agents, the crosslinking agents, or mixtures of these. A coupling agent which may be mentioned is the functionalized silanes. EPM and/or EPDM preferably have an average molecular weight of less than 20 000. The ratio of ethylene to propylene in EPM and/or EPDM may be from 40:60 to 60:40.

Surprisingly, it has been found that the best product properties are achieved if a dry, pulverulent nanoclay is used as starting material for the preparation of the inventive composition/ of the masterbatch, the nanoclay then being modified in a dry process by the pre-exfoliating additive or by the additive mixture. In this process, the nanoclay is coated by the dry additive or by the additive mixture, and use may be made here of conventional dry mixers, in particular those with high rotation rate. "Dry" here means the opposite of a non-pulverulent or pasty (extrudable) mass, or of a slurry or suspension. The inventive modification of the nanoclay is therefore preferably a surface modification process or a surface coating process.

In one of its inventive embodiments, the pulverulent masterbatch in the form of the substantially homogeneous mixture of the pre-exfoliated nanoclay may have been mixed substantially homogeneously with a polymer powder. The polymer powder is intended primarily to inhibit caking of the powder masterbatch when, by way of example, this is stored at an elevated temperature. It contributes decisively to the improvement of the free-flowability of the finished powder masterbatch. A suitable selection criterion for the respective polymer powder to be used is in essence compatibility with the intended further use of the powder masterbatch. Examples which should be mentioned are suitable polymer powders such as polyethylene-ethylene-vinyl acetate copolymers (EVA), ethylene-ethyl acrylate copolymers (EEA), ethylene-methyl acrylate copolymers (EMA), ethylene-butyl acrylate copolymers (EBA), their maleic-anhydride-(MAH)-modified derivatives, ionomers, styrene-elastomer systems, ether-ester block copolymers, polyether-polyamide block copolymers (PEBA), mixtures of thermoplastic polymers, thermoplastic polyurethane elastomers, thermoplastic silicone rubber, or mixtures of the polymers mentioned. Examples which may be mentioned of these mixtures are EVA/SAN, EVA/PA11, EVA/PS, and also PVDF/EVA. The latter is commercially available as ALCRYN from DuPont.

The inventive object is likewise achieved via a polymer masterbatch which has been obtained via compounding of the pulverulent masterbatch in one of its inventive embodiments together with a predetermined carrier polymer.

Carrier polymers suitable for this purpose encompass polyethylene-ethylene-vinyl acetate copolymers (EVA), ethylene-ethyl acrylate copolymers (EEA), ethylene-methyl acrylate copolymers (EMA), ethylene-butyl acrylate copolymers (EBA), their maleic-anhydride-(MAH)-modified derivatives, ionomers, styrene-elastomer systems, ether-ester block copolymers, polyether-polyamide block copolymers (PEBA), mixtures of thermoplastic polymers, thermoplastic polyurethane elastomers, thermoplastic silicone rubber, or mixtures of the polymers mentioned. Examples which may be mentioned of these mixtures are EVA/SAN, EVA/PA11, EVA/PS, and also PVDF/EVA. The latter is commercially available as ALCRYN from DuPont.

A fact which is advantageous and which simplifies industrial application is that substantially the same starting materials are suitable as polymer powder for formation of the substantially homogeneous mixture with the powder masterbatch and as carrier polymer for formation of the polymer masterbatch. The result is not only simpler industrial handling but also avoidance of compatibility problems.

The proportion of the carrier polymer in the polymer masterbatch is from 10 to 90% by weight, preferably from 40 to 70% by weight. For use of the polymer masterbatch is has proven advantageous for it to be in pellet form.

The inventive powder masterbatches or polymer masterbatches, if appropriate in one of the embodiments mentioned, may be introduced into a wide variety of uses as nanofiller in polymers, in polymer compositions, or generally in plastics. This also includes their additional use in previously known filler systems in order to reduce the content of previously conventional filler and generally to improve the property profile of the resultant polymers or polymer compositions.

An important sector here is use in halogen-free flame retardants. Halogen-free fillers substantially used in flame retardants are aluminum hydroxide, aluminum oxide hydrate (boehmite), magnesium hydroxide, magnesium oxide, brucite, magnesium carbonate, hydromagnesite, huntite, bauxite, calcium carbonate, talc, glass powder, melamine isocyanurates, their derivatives and preparations, borates, stannates, and hydroxystannates, phosphates, or any desired mixtures thereof. To ensure compatibility between the halogen-free filler used and the polymer or the polymer composition into which these fillers are to be incorporated in order to generate the halogen-free flame retardant, the prior art previously required that the halogen-free fillers, and in particular mention may be made here of aluminum hydroxides and magnesium hydroxides, had been surface-modified. That was the only way of obtaining a desirable level of mechanical and/or electrical properties. Surprisingly and advantageously, it has now been found that the previously conventional surface-modification of the halogen-free fillers is not needed if the halogen-free fillers mentioned are used together with the inventive masterbatch.

Additional information which should be given in relation to the halogen-free fillers mentioned is that use is particularly made here of aluminum hydroxide (alumina trihydrate (termed ATH) of the general formula $Al_2O_3 \times 3H_2O$) and magnesium hydroxide in their various forms, and for both of these groups it is not only their effectiveness in flame retardants that is worthy of mention, but also their particular effectiveness in the field of reduction of smoke generation, and their use in halogenated, in particular brominated and chlorinated, polymers, also inter alia in PVC. Use in combination with the inventive powder masterbatch or with the inventive polymer masterbatch can reduce the proportion of halogen-free filler without any adverse effect on property profile.

In the case of the magnesium hydroxides, either the synthetic form or the naturally occurring material brucite can equally be used. These fillers are preferably ground to average particle sizes of from 1 to 12 µm, preferably from 2 to 8 µm. When the fillers are used in combination with the inventive masterbatch and the processing temperature is above 180° C., or the service temperature of the finished polymers or plastics is above 150° C. for a prolonged period, particularly good results are achieved when the average particle size of the fillers is from 2 to 8 µm.

One particularly surprising use of the inventive masterbatch, either in its powder masterbatch form or in its polymer masterbatch form, is as a filler in unblended polyolefins or else in their mixtures (also termed "alloys"), in engineering plastics, such as polyamide and polyesters, and also in their mixtures, in polystyrenes, and in thermosets, such as unsaturated polyester (UP) systems and epoxy resin systems.

It has been found that the powder masterbatches or polymer masterbatches used as fillers in these polyolefin systems achieve ideal, i.e. exfoliated dispersion in the polymer matrix, hitherto impossible with non-polar polymers. Previously there were considerable problems in achieving uniform dispersion of even very small proportions, e.g. from 0.1 to 15% by weight, of conventionally obtainable nanoclays in this type of polymer matrix, and the result was considerable impairment of mechanical properties and moreover unpredictable, variable performance in the combustibility test.

A particular overall advantage found with the inventive powder masterbatches and inventive polymer masterbatches is that they can be used as compatibilizers and also as crust-formers and therefore also as effective constituents of flame retardants. The polymer composition may also comprise stabilizers familiar per se to the person skilled in the art.

Another broad field of application for the powder masterbatches or polymer masterbatches is their use as filler in elastomers and in thermosets.

The advantages of the powder masterbatches or polymer masterbatches in their use in the wide variety of polymer systems mentioned may be summarized in very general terms as follows: use of the powder masterbatches or polymer masterbatches achieves improved surface properties of the polymer composition, e.g. surface smoothness or uniformity, absence of greasy surface appearance, and excellent performance in printing and copying processes. Alongside this, there is an improvement in abrasion resistance and a favorable effect on permeability properties, and also on friction properties. A particularly advantageous feature which may be mentioned for industrial utilization is the absence of permeability for various gaseous substances. Processing quality, e.g. in the injection-molding process, can be markedly improved via increased plasticity and moldability. Other advantageous properties which should be mentioned are reduced shrinkage, improved processability in extruders generally, and reduced haze. In blow molding, good processability and an overall effect of stabilizing the blown material were observed. Fire tests, such as B1 and UL 94, revealed less dropping of the material even at very low loading with the nanoclay filler in the form of the powder masterbatch or polymer masterbatch.

Preparation of a polymer composition comprising one of the embodiments of the inventive powder masterbatch can be carried out in a simple manner, as illustrated by way of example for a flame-retardant polymer composition.

First, a nanoclay is selected, pre-exfoliated, and optionally finely ground to give a desired particle size. This gives the pulverulent masterbatch which can also be processed with a polymer powder to give a substantially homogeneous mixture. There are two different possible procedures for introducing this masterbatch with the flame-retardant, preferably also halogen-free filler into the polymer to form the flame-retardant polymer composition. Firstly, the pulverulent masterbatch can be mixed with the filler and then compounded with the polymer to give the flame-retardant polymer composition. In a second variant, the pulverulent masterbatch and the filler, separately from one another, are metered into the stream of the molten polymer, and thus embedded therein, thus forming the flame-retardant polymer composition.

A polymer masterbatch can also be used as the basis for preparation of this type of flame-retardant polymer composition. The polymer desired for the polymer composition is then compounded with one of the inventive embodiments of a polymer masterbatch by first again selecting and pre-exfoliating the nanoclay, and optionally finely grinding it to a desired particle size. This gives a pulverulent masterbatch, if appropriate in a homogeneous mixture with a polymer powder. The resultant powder masterbatch is compounded with a carrier polymer which has been matched to the polymer powder or is the same as the polymer powder used, thus forming a polymer masterbatch, further processing then giving the finished flame-retardant polymer composition. Here again, two alternative procedures are possible. In the first alternative, the polymer masterbatch is mechanically mixed with the polymer in which it is to be incorporated, and is then compounded with the flame-retardant, preferably halogen-free, filler to give the finished flame-retardant polymer composition. In the second variant, the polymer masterbatch is introduced together with the polymer which is to be rendered flame-retardant into a first inlet of the compounding machine, and the flame-retardant filler is added at a later juncture ("downstream") to the molten polymer composition, or is metered in by what is known as the "split-feed" process, thus forming the finished flame-retardant polymer composition.

The process described for the powder masterbatch and for the polymer masterbatch cannot only be used to prepare flame-retardant polymeric compositions but can in principle also be utilized for a wide variety of other applications of the powder masterbatch and of the polymer masterbatch, e.g. in the compounding of polyolefins. The excellent results during compounding are attributable to the fact that via the powder masterbatch, which is also the starting point for the polymer masterbatch, the nanoclay used has by this stage been treated in such a way as to prepare and promote the exfoliation of the layers of the nanoclay used, before the actual compounding step takes place.

Consequently, the compounding process is more effective, and the energy cost and time cost for exfoliating the nanoclay within the desired polymer become lower. The result is a very substantial advantage for compounding when use is made of the prepared masterbatches, because the residence time of the polymer is thus reduced, and the heat history of the polymer is minimized, this being a precautionary measure and counter-measure with respect to thermal degradation. On the other hand, the color strength and the mechanical properties of the finished polymer composition, or of the compounded material, are markedly improved, throughput is increased, and the costs for the compounding process are noticeably reduced. Another substantial advantage which may be mentioned for the use of one of the inventive masterbatches is that the total loading of the polymer or of the polymer composition with the nanoclay can be reduced, indeed preferably to a proportion of 2% by weight, and particularly preferably to a proportion below 1% by weight, without, for example, impairing the flame-retardant properties in the case of use for preparation of a flame retardant. By way of comparison here, the total loading required in the case of conventional loading of the polymer composition with the nanoclay is from 5 to 10% by weight.

These marked improvements during the compounding process itself, and also with respect to the property profile of the compounded polymers or polymer compositions may be explained by the fact that the process of preparing the nanoclays in the form of the masterbatch, serving to promote exfoliation even before the compounding process begins, helps to make mixing of the nanoclay with the polymer and with other halogen-free fillers and/or polymers also used if appropriate more effective than the mixing during the actual compounding step.

By way of example, in the case of a polymer or of a polymer composition based on polypropylene with a total filler loading of 65% by weight, a tensile strain at break of more than 200% (corresponding to 2 m/m) and preferably 500% (corresponding to 5 m/m) or more could be demonstrated after the compounding process, compared with 10% (corresponding to 0.1 m/m) without use of the inventive masterbatches.

The abovementioned processes for preparation of the flame-retardant polymer composition are supplemented via downstream processing steps, such as extrusion of the resultant polymer composition in order to produce cables or wires. Further processes which may follow are injection-molding of the polymer composition, film-blowing, and rotational molding, to mention just a few ways of processing the resultant polymer composition to give a finished product.

The polymers or polymer compositions obtained by using polymeric or pulverulent masterbatches may advantageously be used in the flame retardancy sector as synergists for crust formation and as compatibilizers, but also generally as a means of improving a wide variety of properties in polymer compositions, and as barrier-layer-forming compositions. Elastomers and thermosets are also among these polymer compositions whose properties can be noticeably improved.

Selected inventive examples will be used below for more detailed illustration of the invention.

EXAMPLES

The polymer compositions obtained in the inventive examples and in the comparative examples were subjected to the standard tests and standard measurements mentioned below:

melt index (MFI) to DIN 53 735,
tensile strength to DIN 53 455, tensile strain at break to DIN 53 455, impact resistance test ($a_n$) to DIN 53 454, combustion performance by the UL 94 test, Underwriters Laboratories standard.

UTBD (untamped bulk density) is the term used for uncompacted bulk density in kg/l.

The high-speed mixer used was always a 60/2500 from M.T.I.

I. Preparation of a Powder Masterbatch

Comparative Example 1

A commercially available high-speed mixer, which has to have explosion protection, is used as follows:
100 kg of "Nanofil 15" nanoclay from Südchemie AG, Germany, are heated to a temperature of about 45° C. at 1360 rpm (revolutions per minute), and at this temperature
34 kg of fatty acid ester (glyceryl stearate from KeBo, Germany) are metered in as additive over a period of about 30 s.
    The reaction mixture is heated to the discharge temperature of 100° C. at the stated rotation rate, and is then cooled to a final temperature of about 30° C. in a cooling mixer.
40 kg of an EVA powder are mixed homogeneously with the reaction mixture obtained above, in order to inhibit caking, e.g. on storage at a relatively high temperature, and the material is drawn off and packed into sacks having a barrier layer.

The resultant powder masterbatch is a free-flowing, almost dust-free powder with very good metering capability, its UTBD being 0.65 kg/l. The very good metering capability makes this powder masterbatch very suitable for continuous compounding assemblies. An inventive composition analogous to this example and to the examples below may also be correspondingly prepared via omission of the EVA constituent. EVA can also be replaced by other polymers, such as polyolefin powder.

Inventive Example 2

A commercially available high-speed mixer, which has to have explosion protection, is used as follows:
100 kg of "Nanofil 15" nanoclay from Südchemie AG, Germany, are heated to a temperature of about 45° C. at 1360 rpm (revolutions per minute), and at this temperature
24 kg of fatty acid amine (Genamin SH 100, Clariant, Germany), and
4.4 kg of "Lithsolvent PL" polydiethylsiloxane, both from KeBo, Düsseldorf, Germany, are metered in in the stated sequence as additive.
    The reaction mixture is heated to the discharge temperature of 90° C. at the stated rotation rate, and is then cooled to a final temperature of about 30° C. in a cooling mixer.
20 kg of an EVA powder are mixed homogeneously with the reaction mixture obtained above, in order to inhibit caking, e.g. on storage at a relatively high temperature, and the material is drawn off and packed into sacks having a barrier layer.

The resultant powder masterbatch is a free-flowing, almost dust-free powder with very good metering capability, its UTBD being 0.82 kg/l. The very good metering capability makes this powder masterbatch very suitable for continuous compounding assemblies.

Inventive Example 2a

A commercially available high-speed mixer, which has to have explosion protection, is used as follows:
100 kg of "Nanofil 5" nanoclay from Südchemie AG, Germany, are heated to a temperature of about 45° C. at 1360 rpm (revolutions per minute), and at this temperature
24 kg of rapeseed oil methyl ester (Kebonal 20, KeBo), and
4.4 kg of "Lithsolvent PL" polydiethylsiloxane, both from KeBo, Düsseldorf, Germany, are metered in in the stated sequence as additive over a period of about 30 s.
    The reaction mixture is heated to the discharge temperature of 90° C. at the stated rotation rate, and is then cooled to a final temperature of about 30° C. in a cooling mixer.
    The resultant powder masterbatch is a free-flowing, almost dust-free powder with very good metering capability, its UTBD being 0.69 kg/l. The very good metering capability makes this powder masterbatch very suitable for continuous compounding assemblies.

Inventive Example 3

A commercially available high-speed mixer, which has to have explosion protection, is used as follows:
100 kg of "Nanofil 5" nanoclay from Südchemie AG, Germany, are heated to a temperature of about 45° C. at 1360 rpm (revolutions per minute), and at this temperature
4.4 kg of polyphenylmethylsiloxane from ABCR Research Chemical, Karlsruhe, Germany, and
24.4 kg of stearic ester (glyceryl stearate from KeBo, Germany) are metered in the stated sequence as additive over a period of about 30 s.
    The reaction mixture is heated to the discharge temperature of 130° C. at the stated rotation rate, and is then cooled to a final temperature of about 30° C. in a cooling mixer.
    The resultant powder masterbatch is a free-flowing, almost dust-free powder with very good metering capability, its UTBD being 0.65 kg/l. The very good metering capability makes this powder masterbatch very suitable for continuous compounding assemblies.

Example 4

A commercially available high-speed mixer, which has to have explosion protection, is used as follows:
100 kg of "Nanofil 948" nanoclay from Südchemie AG, Germany, are heated to a temperature of about 45° C. at 1360 rpm (revolutions per minute), and at this temperature
24.4 kg of rapeseed oil methyl ester (Kebonal 20, KeBo), and
4.4 kg of "Lithsolvent PL" polydiethylpolysiloxane, both from KeBo, Düsseldorf, Germany, are metered in the stated sequence as additive over a period of about 30 s.
    The reaction mixture is heated to the discharge temperature of 110° C. at the stated rotation rate, and is then cooled to a final temperature of about 30° C. in a cooling mixer.
80 kg of an EVA powder are mixed homogeneously with the reaction mixture obtained above, in order to inhibit caking, e.g. on storage at a relatively high temperature, and the material is drawn off and packed into sacks having a barrier layer.

The resultant powder masterbatch is a free-flowing, almost dust-free powder with very good metering capability, its UTBD being 0.73 kg/l. The very good metering capability makes this powder masterbatch very suitable for continuous compounding assemblies.

Inventive Example 5

A commercially available high-speed mixer, which has to have explosion protection, is used as follows:
100 kg of "Nanofil 5" nanoclay from Südchemie AG, Germany, are heated to a temperature of about 45° C. at 1360 rpm (revolutions per minute), and at this temperature
24.4 kg of castor oil ethyl ester (Kebonal 60A, KeBo), and
4.4 kg of polyphenylmethylsiloxane from ABCR Research Chemical, Germany, are metered in the stated sequence as additive over a period of about 30 s.
The reaction mixture is heated to the discharge temperature of 85° C. at the stated rotation rate, and is then cooled to a final temperature of about 30° C. in a cooling mixer.
40 kg of an EVA powder are mixed homogeneously with the reaction mixture obtained above, in order to inhibit caking, e.g. on storage at a relatively high temperature, and the material is drawn off and packed into sacks having a barrier layer.
The resultant powder masterbatch is a free-flowing, almost dust-free powder with very good metering capability, its UTBD being 0.67 kg/l. The very good metering capability makes this powder masterbatch very suitable for continuous compounding assemblies.

Inventive Example 6

A commercially available high-speed mixer, which has to have explosion protection, is used as follows:
100 kg of "Elementis EA 108" nanoclay from Elementis USA, are heated to a temperature of about 45° C. at 1360 rpm (revolutions per minute), and at this temperature
24.4 kg of rapeseed oil methyl ester (Kebonal 20, KeBo), and
4.4 kg of "Lithsolvent PL" polydiethylpolysiloxane, from KeBo, Düsseldorf, Germany, are metered in in the stated sequence as additive over a period of about 30 s.
The reaction mixture is heated to the discharge temperature of 100° C. at the stated rotation rate, and is then cooled to a final temperature of about 30° C. in a cooling mixer.
80 kg of an EVA powder are mixed homogeneously with the reaction mixture obtained above, in order to inhibit caking, e.g. on storage at a relatively high temperature, and the material is drawn off and packed into sacks having a barrier layer.
The resultant powder masterbatch is a free-flowing, almost dust-free powder with very good metering capability, its UTBD being 0.81 kg/l. The very good metering capability makes this powder masterbatch very suitable for continuous compounding assemblies.

Inventive Example 7

A commercially available high-speed mixer, which has to have explosion protection, is used as follows:
100 kg of "SCP 30 B" nanoclay from Southern Clay Products, Gonzales, Tex., USA, are heated to a temperature of about 45° C. at 1360 rpm (revolutions per minute), and at this temperature
24.4 kg of rapeseed oil methyl ester (Kebonal 20, KeBo), and
4.4 kg of "Lithsolvent PL" polydiethylpolysiloxane, from KeBo, Düsseldorf, Germany, are metered in in the stated sequence as additive over a period of about 30 s.
The reaction mixture is heated to the discharge temperature of 100° C. at the stated rotation rate, and is then cooled to a final temperature of about 30° C. in a cooling mixer.
80 kg of an EVA powder are mixed homogeneously with the reaction mixture obtained above, in order to inhibit caking, e.g. on storage at a relatively high temperature, and the material is drawn off and packed into sacks having a barrier layer.
The resultant powder masterbatch is a free-flowing, almost dust-free powder with very good metering capability, its UTBD being 0.61 kg/l. The very good metering capability makes this powder masterbatch very suitable for continuous compounding assemblies.

Inventive Example 8

A commercially available high-speed mixer, which has to have explosion protection, is used as follows:
100 kg of "Nanofil 5" nanoclay from Südchemie AG, Germany, are heated to a temperature of about 60° C. at 1360 rpm (revolutions per minute), and at this temperature
24.4 kg of "Lithsolvent OF" isostearyl titanate, and
4.4 kg of "Lithsolvent PL" polydiethylpolysiloxane, both from KeBo, Düsseldorf, Germany, are metered in the stated sequence as additive over a period of about 30 s.
The reaction mixture is heated to the discharge temperature of 65° C. at the stated rotation rate, and is then cooled to a final temperature of about 30° C. in a cooling mixer.
The resultant powder masterbatch is a free-flowing, almost dust-free powder with very good metering capability, its UTBD being 0.56 kg/l. The very good metering capability makes this powder masterbatch very suitable for continuous compounding assemblies.

Inventive Example 14

A commercially available high-speed mixer, which has to have explosion protection, is used as follows:
100 kg of "Nanofil 32" nanoclay from Südchemie AG, Germany, are heated to a temperature of about 45° C. at 1360 rpm (revolutions per minute), and at this temperature
24.4 kg of "Lithsolvent OF" isostearyl titanate and
4.4 kg of "Lithsolvent PL" polydiethylsiloxane, both from KeBo, Düsseldorf, Germany, are then metered in the stated sequence as additive over a period of about 30 s.
The reaction mixture is heated to the discharge temperature of 100° C. at the stated rotation rate, and is then cooled to a final temperature of about 30° C. in a cooling mixer.
40 kg of an EVA powder are mixed homogeneously with the reaction mixture obtained above, in order to inhibit caking, e.g. on storage at a relatively high temperature, and the material is drawn off and packed into sacks having a barrier layer.
The resultant powder masterbatch is a free-flowing, almost dust-free powder with very good metering capability, its UTBD being 0.86 kg/l. The very good metering capability makes this powder masterbatch very suitable for continuous compounding assemblies.

II. Preparation of a Polymer Masterbatch

In principle, any of the processing machines used in the compounding industry for preparation of highly filled systems may be used for preparation of a polymer masterbatch, examples being a two-roll mill, internal mixer, FCM, single-screw extruder, twin-screw extruder, Buss co-kneader, or a comparable processing machine. If a Buss co-kneader is used, its process length should correspond to at least 11 L/D.

Inventive Example 15

The powder masterbatch obtained from Inventive Example 2 and the carrier polymer selected with respect to the desired finished polymer or the polymer composition are introduced into a Buss co-kneader or into a comparative suitable processing machine.

In the inventive example, 60% by weight of the powder masterbatch obtained as in Example 2 and 40% by weight of the carrier polymer are used. For the purposes of this inventive example, the carrier polymer used comprises EVA, as is obtainable commercially with the name "Escorene Ultra UL 00119" from Exxon-Mobil.

Zones 1 and 2 of the Buss co-kneader, and also its pelletizing screw (PS) are heated to about 135° C., and the die is heated to about 145° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

Inventive Example 16

The polymer masterbatch as in Inventive Example 16 is obtained as stated in Inventive Example 15, but the powder masterbatch obtained as in Inventive Example 2a is used here instead of the powder masterbatch of Inventive Example 2.

Inventive Example 17

The polymer masterbatch as in Inventive Example 17 is obtained as stated in Inventive Example 15, but the powder masterbatch obtained as in Inventive Example 3 is used here instead of the powder masterbatch of Inventive Example 2.

Inventive Example 18

The polymer masterbatch as in Inventive Example 18 is obtained as stated in Inventive Example 15, but the powder masterbatch obtained as in Inventive Example 8 is used here instead of the powder masterbatch of Inventive Example 2.

Inventive Example 19

The powder masterbatch obtained from Inventive Example 2 and the carrier polymer selected with respect to the desired finished polymer or the polymer composition are introduced into a Buss co-kneader or into a comparative suitable processing machine.

In the inventive example, 60% by weight of the powder masterbatch obtained as in Example 2 and 40% by weight of the carrier polymer are used. The carrier polymer used for the purposes of this inventive example comprised an EP-g-MAH, as is available commercially with the name "FUSABOND" from DuPont, USA.

Zones 1 and 2 of the Buss co-kneader, and also its PS are heated to about 165° C., and the die is heated to about 170° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

Inventive Example 20

The powder masterbatch obtained from Inventive Example 2 and the carrier polymer selected with respect to the desired finished polymer or the polymer composition are introduced into a Buss co-kneader or into a comparative suitable processing machine.

In the inventive example, 60% by weight of the powder masterbatch obtained as in Example 2 and 40% by weight of the carrier polymer are used. The carrier polymer used for the purposes of this inventive example comprised a PP-g-MAH as available commercially with the name "EXXELOR PO 1050" from Exxon-Mobil.

Zones 1 and 2 of the Buss co-kneader, and also its PS are heated to about 165° C., and the die is heated to about 175° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

Inventive Example 21

The powder masterbatch obtained from Inventive Example 8 and the carrier polymer selected with respect to the desired finished polymer or the polymer composition are introduced into a Buss co-kneader or into a comparative suitable processing machine.

In the inventive example, 60% by weight of the powder masterbatch obtained as in Example 2 and 40% by weight of the carrier polymer are used. The carrier polymer used for the purposes of this inventive example comprised EEA as is available commercially with the name "Escor 5000" from Exxon-Mobil.

Zones 1 and 2 of the Buss co-kneader, and also its PS are heated to about 125° C., and the die is heated to about 135° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

Inventive Example 22

The powder masterbatch obtained from Inventive Example 3 and the carrier polymer selected with respect to the desired finished polymer or the polymer composition are introduced into a Buss co-kneader or into a comparative suitable processing machine.

In the inventive example, 60% by weight of the powder masterbatch obtained as in Example 3 and 40% by weight of the carrier polymer are used. The carrier polymer used for the purposes of this inventive example comprised a calcium ionomer as is available commercially with the name "ACLYN AC 201 A" from Allied Signal, USA.

Zones 1 and 2 of the Buss co-kneader, and also its PS are heated to about 125° C., and the die is heated to about 135° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

Inventive Example 23

The powder masterbatch obtained from Inventive Example 8 and the carrier polymer selected with respect to the desired finished polymer or the polymer composition are introduced into a Buss co-kneader or into a comparative suitable processing machine.

In the inventive example, 60% by weight of the powder masterbatch obtained as in Example 3 and 40% by weight of the carrier polymer are used. The carrier polymer used for the purposes of this inventive example comprised an EAAZ polymer as is obtainable commercially with the name "Iotek 7010" from Exxon-Mobil, USA.

Zones 1 and 2 of the Buss co-kneader, and also its PS are heated to about 110° C., and the die is heated to about 125° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

Inventive Example 24

The powder masterbatch obtained from Inventive Example 3 and the carrier polymer selected with respect to the desired finished polymer or the polymer composition are introduced into a Buss co-kneader or into a comparative suitable processing machine.

In the inventive example, 60% by weight of the powder masterbatch obtained as in Example 3 and 40% by weight of the carrier polymer are used. The carrier polymer used for the purposes of this inventive example comprised a maleic anhydride-(MAH)-modified polypropylene, as is available commercially with the name "EXXELOR PO 1015" from Exxon-Mobil, USA, which had been blended with 10% by weight of Escorene Ultra 00328, likewise from Exxon-Mobil.

Zones 1 and 2 of the Buss co-kneader, and also its PS are heated to about 185° C., and the die is heated to about 200° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

Inventive Example 25

The powder masterbatch obtained from Inventive Example 5 and the carrier polymer selected with respect to the desired finished polymer or the polymer composition are introduced into a Buss co-kneader or into a comparative suitable processing machine.

In the inventive example, 60% by weight of the powder masterbatch obtained as in Example 3 and 40% by weight of the carrier polymer are used. The carrier polymer used for the purposes of this inventive example comprised polycaprolactam, as is available commercially with the name "Grilamid 20 LM" from EMS-Chemie, Switzerland.

Zones 1 and 2 of the Buss co-kneader, and also its PS are heated to about 200° C., and the die is heated to about 220° C., and the carrier polymer is continuously metered into the main intake of the Buss co-kneader. The corresponding amount of the selected powder masterbatch is added in the ratio by weight stated above, e.g. by means of a gravimetric feed system, into the main intake of the Buss co-kneader. In the barrel, the powder masterbatch is mixed with the carrier polymer, and the resultant polymer masterbatch is then processed to give pellets, cooled, and drawn off.

The polymer masterbatch is obtained in the form of cylindrical or lenticular pellets.

III. Powder Masterbatch and Polymer Masterbatch in Selected Polymer Compositions All of the percentages in the tables below are based on percent by weight unless otherwise stated.

The following abbreviations are used in the tables:

ATH=alumina trihydrate of the general formula $$Al_2O_3 \times 3H_2O$$

PUMB=powder masterbatch
POMB=polymer masterbatch

TABLE 1

|  | Inventive Example | | |
|---|---|---|---|
|  | P1 [%] | P2 [%] | P3 [%] |
| Escorene Ultra 00119 | 40 | 40 | 40 |
| ATH 4 m²/g | 54 | 54 | 54 |
| PUMB of Inv. Ex. 3 | 6 |  |  |
| PUMB of Inv. Ex. 6 |  | 6 |  |
| PUMB of Inv. Ex. 7 |  |  | 6 |
| Melt index g/10 min 190/10 | 8 | 6 | 3 |
| Tensile strength N/mm² | 11 | 10 | 10 |
| Tensile strain at break m/m | 6.8 | 4.8 | 2.3 |

The results obtained as in Table 1 show, when compared with the values obtained in the comparative example as in Table 3, that use of the inventive powder masterbatch gave substantially improved tensile strain at break with the same and sometimes even better tensile strengths, while flame retardancy properties were at least the same.

TABLE 2

| | Inventive Example | | | |
|---|---|---|---|---|
| | P5 [%] | P6 [%] | P7 [%] | P8 [%] |
| Escorene Ultra 00119 | 36 | 36 | 36 | 36 |
| ATH 4 m²/g | 54 | 54 | 54 | 54 |
| POMB of Inv. Ex. 23 | 10 | | | |
| POMB of Inv. Ex. 17 | | 10 | | |
| POMB of Inv. Ex. 19 | | | 10 | |
| POMB of Inv. Ex. 18 | | | | 10 |
| Melt index g/10 min 190/10 | 5 | 8.5 | 4 | 6 |
| Tensile strength N/mm² | 8 | 11.8 | 10.5 | 9.4 |
| Tensile strain at break m/m | 6.1 | 5.9 | 4.2 | 7 |

Table 2 states results obtained using inventive polymer masterbatches. When comparison is made with the tensile strain at break values obtained in Table 1 using powder masterbatches, the values are seen, with one exception, to be further improved.

With respect to comparison with the values obtained in Table 3, the statements previously made in relation to Table 1 are in principle again applicable.

TABLE 3

| | Comparative Example | | | |
|---|---|---|---|---|
| | C1 [%] | C2 [%] | C3 [%] | C4 [%] |
| Escorene Ultra 00119 | 40 | 40 | 40 | 40 |
| ATH 4 m²/g | 60 | | 54 | 54 |
| Mg(OH)₂ - FR 20 | | 60 | | |
| Nanofil 15 | | | 6 | |
| Nanofil 5 | | | | 6 |
| Melt index g/10 min 190/10 | 1 | 1 | 1.5 | 0.75 |
| Tensile strength N/mm² | 9.7 | 10.8 | 10 | 9.3 |
| Tensile strain at break m/m | 1.4 | 1.2 | 1.5 | 4 |

FR 20 is the name used by the producer, Dead Sea Bromine, Israel, for the grade of magnesium hydroxide used here.

The values obtained in the comparative example for melt index and tensile strain at break are themselves borderline with respect to processability. The values obtained in C1, C2, and C4 for tensile strain at break are below the standard of 1.5.

TABLE 4

| | Inventive Example | | | |
|---|---|---|---|---|
| | P9 [%] | P10 [%] | P11 [%] | P12 [%] |
| PP-Eltex KL 104 | 30 | 30 | 30 | 30 |
| Mg(OH)₂ FR 20 | 60 | 60 | 60 | 60 |
| POMB of Inv. Ex. 16 | 10 | | | |
| POMB of Inv. Ex. 18 | | 10 | | |
| POMB of Inv. Ex. 19 | | | 10 | |
| POMB of Inv. Ex. 23 | | | | 10 |
| Melt index g/10 min 230/5 | 6.2 | 8.0 | 7 | 10 |
| Tensile strength N/mm² | 13.4 | 16 | 15.0 | 12.1 |
| Tensile strain at break m/m | 2.1 | 1.9 | 2.0 | 2.9 |
| Impact resistance | 55 | no fracture (60) | no fracture (60) | no fracture (45) |

The values stated in brackets with respect to impact resistance indicate the impact energy determined in each case when the material exhibited no fracture.

Fracture of the material was found only for Inventive Example P9. However, a good value for impact resistance was nevertheless achieved and was far above the values for the comparative examples as in Table 5, and which still provides good processability, including in construction of casings.

TABLE 5

| | Comparative Example | | | |
|---|---|---|---|---|
| | C5 [%] | C6 [%] | C7 [%] | C8 [%] |
| PP-Eltex KL 104 | 35 | 35 | 35 | 35 |
| Mg(OH)₂ FR 20 | 65 | 59 | 59 | 59 |
| Nanofil 948 | | 6 | | |
| Elementis EA 108 | | | 6 | |
| Cloisite 30 B | | | | 6 |
| Melt index g/10 min 230/5 | 0.1 | 1.0 | 1.0 | 1.0 |
| Tensile strength N/mm² | 15 | 13 | 14 | 13.5 |
| Tensile strain at break m/m | 0.01 | 0.09 | 0.1 | 0.08 |
| Impact resistance | 8 | 10 | 12 | 9 |

The impact resistance achieved in these comparative examples is far below the values required, for example, in construction of casings. An impact resistance of 8, as was determined for Comparative Example C5, indicates a very brittle, hard material, and is unsuitable for construction of casings. Impact resistances required here are at least 30.

Because all of the materials of Comparative Examples C5 to C8 exhibited fracture of the material, there was no need to state fracture energy here.

TABLE 6

| | Inventive Example | | | |
|---|---|---|---|---|
| | P13 [%] | P14 [%] | P15 [%] | P16 [%] |
| PA Ultramid B3L | 45 | 45 | 45 | 45 |
| Mg(OH)₂ FR 20 | 45 | 45 | 45 | 45 |
| POMB of Inv. Ex. 22 | 10 | | | |
| POMB of Inv. Ex. 24 | | 10 | | |
| POMB of Inv. Ex. 25 | | | 10 | |
| POMB of Inv. Ex. 20 | | | | 10 |
| Melt index g/10 min 275/10 | | | | |
| Tensile strength N/mm² | 39 | 46 | 43 | 49 |
| Tensile strain at break m/m | 0.02 | 0.09 | 0.05 | 0.07 |
| Impact resistance | 20 | 28 | 18 | 35 |

Tensile strain at break is a problematic property which may be mentioned for engineering polyamides, for example with the PA6 Ultramid B3L used here. It is normally not above 0.02 for engineering polyamides, as clearly shown by Table 7 with the Comparative Experiments C9-C12. Only C10 exhibits a value improved by one order of magnitude, because AMEO was also used in that example. The conventionally poor values for tensile strain at break are seen in brittle fracture of conventional engineering polyamides.

TABLE 7

| | Comparative Example | | | |
|---|---|---|---|---|
| | C9 [%] | C10 [%] | C11 [%] | C12 [%] |
| PA6 Ultramid B3L | 45 | 45 | 45 | 45 |
| Mg(OH)$_2$ FR 20 | 55 | | 49 | 49 |
| FR 20 (+1% AMEO) | | 55 | | |
| Cloisite 25 A | | | 6 | |
| Cloisite 30 B | | | | 6 |
| Melt index g/10 min 275/10 | | | | |
| Tensile strength N/mm$^2$ | 50 | 60 | 35 | 40 |
| Tensile strain at break m/m | 0.02 | 0.03 | 0.01 | 0.01 |
| Impact resistance | 20 | 32 | 13 | 12 |

As previously apparent from the comments on Table 6, tensile strain at break is exceptionally important for the type of engineering polyamides used here for the polymer composition. As is seen here, each of the inventively prepared polymer compositions with the exception of P13 has a tensile strain at break which is at least three orders of magnitude above the values ever conventionally achieved in the prior art for tensile strain at break.

TABLE 8 with polar (starting) polymer:

| | Inventive Example/Comparative Example | | | | | | | |
|---|---|---|---|---|---|---|---|---|
| | C13 [%] | C17 [%] | P18 [%] | P19 [%] | P20 [%] | C14 [%] | C21 [%] | P22 [%] |
| PE-EVA 00119 | 100 | 95 | 80 | 80 | 95 | 80 | 90 | 90 |
| Nanofil 5 | | 5 | | | | 20 | | |
| PUMB 2 | | | 20 | | | | | |
| PUMB 2a | | | | 20 | | | | |
| PUMB 6 | | | | | 5 | | | |
| PUMB 1 | | | | | | | 10 | |
| PUMB 5 | | | | | | | | 10 |
| Melt index g/10 min 190/10 | 6 | 12 | 14 | 16 | 15 | 6 | 12 | 16 |
| Tensile strength N/mm$^2$ | 26 | 22 | 19 | 28 | 17 | 13 | 21 | 24 |
| Tensile strain at break m/m | 17 | 14 | 13 | 18 | 12 | 8.5 | 12 | 17 |
| Speck test, visual grade | 1 | 5 | 1 | 1 | 1 | 6 | 4 | 1 |

For visual assessment of the products, the polymer compositions prepared (pellets) were pressed between hot plates to give a thin film (pressed sheet) and assessed on a black background for the presence of pale "specks", i.e. non-homogeneously dispersed nanoclay:

Grade 1: no visible specks at all at 10× magnification Grade 6: extremely large number of specks discernible by the naked eye The polymer compositions prepared inventively with polar (starting) polymer, which hitherto were regarded as impossible to realize in the prior art, exhibit an excellent property profile. A particularly advantageous feature found is that no burrs are produced during the extrusion process, and that the material is in all respects capable of very good extrusion. Shrinkage during the mold-casting process is smaller and the surface is markedly better.

The trials are also designed to contradict a prejudice widespread among persons skilled in the art, according to which the property profile of the polymer compositions or of the compounded polymer materials can be improved linearly with a higher proportion of filler.

As Table 8 shows, the experimental pair P21-P22 has the most balanced property profile, with high test values or balanced intermediate values for the properties studied.

TABLE 9 with non-polar (starting) polymer:

| | Inventive Example/Comparative Example | | | | | | |
|---|---|---|---|---|---|---|---|
| | C15 [%] | C16 [%] | C23 [%] | P24 [%] | C25 [%] | P26 [%] | P27 [%] |
| Riblene FL 30 | 100 | 80 | 80 | 80 | 95 | 90 | 90 |
| Nanofil 5 | | 20 | | | | | |
| PUMB from Inv. Ex. 1 | | | 20 | | 5 | | |
| PUMB from Inv. Ex. 3 | | | | 20 | | | |
| POMB from Inv. Ex. 17 | | | | | | 10 | |
| POMB from Inv. Ex. 21 | | | | | | | 10 |
| Melt index g/10 min 190/10 | 4 | 20 | 42 | 47 | 39 | 46 | 39 |
| Tensile strength N/mm$^2$ | 13.5 | 10 | 11 | 12 | 12.5 | 13.0 | 12.6 |
| Ultimate tensile strength N/mm$^2$ | | | | | | | |
| Tensile strain at break m/m | 9.0 | 0.2 | 1.4 | 1.3 | 5.8 | 3.4 | 2.8 |
| Speck test, visual grade | 1 | 6 | 4 | 1-2 | 3-4 | 1 | 1 |

This example of a polymer composition or of a compounded polymer material relates to a film grade for blown-film production. The non-linearity previously mentioned for the polymer/filler masterbatch compositions with respect to the percentage proportions of the masterbatch, which fundamentally also represents a filler, is again clearly seen here. Experiment P25 achieved a very good overall profile of properties with balanced test results, the profile being, when compared, even better than, for example, in Experiments P23 and P24 with 20% of masterbatch.

However, P23 and P24 also show markedly better values when compared with the Comparative Experiment C16. Film stability is not ensured with the material of the comparative experiment mentioned, with only 0.2 for tensile strain at break.

TABLE 10 with non-polar (starting) polymer:

| | Example | | | | | | |
|---|---|---|---|---|---|---|---|
| | C17 [%] | C18 [%] | P28 [%] | P29 [%] | P31 [%] | P32 [%] | P33 [%] |
| Eltex KL 104 | 100 | 95 | 95 | 95 | 80 | 90 | 90 |
| Nanofil 5 | | 5 | | | | | |

TABLE 10-continued with non-polar (starting) polymer:

Example

| | C17 [%] | C18 [%] | P28 [%] | P29 [%] | P31 [%] | P32 [%] | P33 [%] |
|---|---|---|---|---|---|---|---|
| PUMB, Inv. Ex. 5 | | | 5 | | 20 | | |
| PUMB, Inv. Ex. 8 | | | | 5 | | | |
| POMB, Inv. Ex. 18 | | | | | | 10 | |
| POMB, Inv. Ex. 20 | | | | | | | 10 |
| Melt index g/10 min 190/10 | 2 | 18 | 24 | 25 | 31 | 28 | 24 |
| Tensile strength N/mm² | 31 | 23 | 24.5 | 31.5 | 20.5 | 28 | 29 |
| Tensile strain at break m/m | 16 | 10 | 11 | 15 | 12 | 10 | 8.0 |
| Speck test, visual grade | 1 | 6 | 1-2 | 1-2 | 1-2 | 1 | 1 |

Eltex KL 104 in Table 10 designates a polypropylene used for injection molding and extrusion. The most balanced property profile can again be achieved with the inventive polymer compositions or inventive compounded polymer materials with compositions of Experiments P28-P30. The non-linearity can therefore also be observed here.

In contrast, P30 achieves an excellent value for melt index, whereas here the tensile strain at break obtained is less favorable. However, this is not decisive for the processing method mentioned. Tensile strain at break for polypropylene is fundamentally set by way of the extrusion process itself.

Fundamentally, it can be stated that the polymers, polymer compositions and, respectively, compounded materials prepared with use of powder masterbatches or of polymer masterbatches have substantial advantages over the polymers, polymer compositions and, respectively, compounded materials known hitherto in the prior art and prepared only with nanoclays as fillers. They are capable of more effective processing, are substantially dust-free, and exhibit relatively high bulk density (uncompacted).

What is claimed is:

1. A composition, comprising an organically intercalated phyllosilicate, wherein the organically intercalated phyllosilicate has been modified by treatment with at least one siloxane component and at least one non-anionic fatty acid derivative which has at least one aliphatic or cyclic radical having from 6 to 32 carbons.

2. The composition as claimed in claim 1, wherein the average particle size of the organically intercalated phyllosilicate is from 0.1 to 1000 μm.

3. The composition as claimed in claim 1, wherein the organically intercalated phyllosilicate comprises a ground organically intercalated phyllosilicate.

4. The composition as claimed in claim 1, wherein the non-anionic fatty acid derivative is selected from the group consisting of the derivatives of saturated or unsaturated fatty acids, polymer fatty acids, and mixtures thereof.

5. The composition as claimed in claim 1, wherein the non-anionic fatty acid derivative has at least one aliphatic or cyclic radical having from 8 to 22 carbon atoms.

6. The composition as claimed in claim 1, wherein the fatty acid derivative derives from fatty acids having form 10 to 30 carbon atoms.

7. The composition as claimed in claim 1, wherein the fatty acid derivative is selected from the group consisting of hydrogenated derivatives, alcohol derivatives, amine derivatives, and their mixtures.

8. The composition as claimed in claim 1, wherein the fatty acid derivatives derive from the group consisting of polymeric fatty acids, keto fatty acids, fatty acid alkyloxazolines and fatty acid alkylbisoxazolines, or and their mixtures.

9. The composition as claimed in claim 1, wherein the siloxane component is selected from the group of oligomeric or polymeric siloxanes, siloxane derivatives including oligoalkylsioxanes, polydialky-siloxanes, polyalkylarylsiloxanes, polydiarylsiloxanes, and their mixtures.

10. The composition as claimed in claim 1, wherein the siloxane component comprises siloxane derivatives functionalized by at least one reactive group.

11. The composition as claimed in claim 1, further comprising a component selected from the group consisting of ethylene-propylene copolymers (EPM), ethylene-propylene terpolymers (EPDM), thermoplastic elastomers, coupling agents, crosslinking agents, and mixtures of these.

12. The composition as claimed in claim 11, wherein an average molecular weight of the EPM and EPDM of less than 20,000.

13. The composition as claimed in claim 11, wherein an ethylene: propylene ratio of the EPM and EPDM ranges from 40:60 to 60:40.

14. A substantially homogenous mixture of the composition as claimed in claim 1 with a polymer powder.

15. A polymer-containing composition which has been obtained via compounding of the composition as claimed in claim 1 with a carrier polymer.

16. The polymer-containing composition as claimed in claim 15, wherein the carrier polymer is selected from the group consisting of polyethylene-ethylene-vinyl acetate copolymer (EVA), ethylene-ethyl acrylate copolymer (EEA), ethylene-methyl acrylate copolymer (EMA), ethylene-butyl acrylate copolymer (EBA), their maleic-anhydride-(MAH)-modified derivatives, ionomers, styrene-elastomer systems, ether-ester block copolymers, polyether-polyamide block copolymers (PEBA), mixtures of thermoplastic polymers, thermoplastic polyurethane elastomers, thermoplastic silicone rubber, and their mixtures.

17. The polymer-containing composition as claimed in claim 15, wherein the carrier polymer comprises from 10 to 90%.

18. The polymer-containing composition as claimed in claim 15 in pellet or granular form.

19. A filler in polymers or polymer compositions comprising the polymer-containing composition as claimed in claim 15.

20. A filler system for polymers or polymer compositions comprising the polymer-containing composition as claimed in claim 15.

21. A material comprising the filler system of claim 20 in combination with a flame-retardant halogen-containing or halogen-free filler.

22. The material as claimed in claim 21, wherein the halogen-free flame-retardant filler is selected from aluminum hydroxide, aluminum oxide hydrate (boehmite), magnesium hydroxide, magnesium oxide, brucite, magnesium carbonate, hydromagnesite, huntite, bauxite, calcium carbonate, talc, glass powder, melamine isocyanurates, their derivatives and preparations, borates, stannates, and hydroxystannates, phosphates, and their mixtures.

23. Engineering plastics and their mixtures, and alloys containing the filler of claim 19.

24. Elastomers and thermosets containing the filler of claim 19.

25. The composition as claimed in claim 1, wherein the non-anionic fatty acid derivative is selected from the group consisting of fatty alcohols, fatty amines, triglyceride esters, alkyl esters of fatty acids, and waxes and mixtures thereof.

26. The composition as claimed in claim 1, wherein the non-anionic fatty acid derivative has at least one aliphatic or cyclic radical having 10 to 18 carbon atoms.

* * * * *

UNITED STATES PATENT AND TRADEMARK OFFICE
CERTIFICATE OF CORRECTION

| | |
|---|---|
| PATENT NO. | : 7,528,191 B2 |
| APPLICATION NO. | : 10/541496 |
| DATED | : May 5, 2009 |
| INVENTOR(S) | : Metzemacher et al. |

Page 1 of 1

It is certified that error appears in the above-identified patent and that said Letters Patent is hereby corrected as shown below:

In the Claims:

Claim 6, col. 24, line 7, please delete "form" and substitute therefor -- from --.

Claim 9, col. 24, line 19, please delete "olihoslkylsioxanes" and substitute therefor -- olihoslkylsiloxanes --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO.        : 7,528,191 B2
APPLICATION NO.   : 10/541496
DATED             : May 5, 2009
INVENTOR(S)       : Metzemacher et al.

Page 1 of 1

It is certified that error appears in the above-identified patent and that said Letters Patent is hereby corrected as shown below:

In the Claims:

Claim 6, col. 24, line 7, please delete "form" and substitute therefor -- from --.

Claim 9, col. 24, line 19, please delete "olihoslkylsioxanes" and substitute therefor -- oligoalkylsiloxanes --.

This certificate supersedes the Certificate of Correction issued November 3, 2009.

Signed and Sealed this

Sixteenth Day of February, 2010

David J. Kappos
*Director of the United States Patent and Trademark Office*